April 14, 1942. L. G. SELMI ET AL Re. 22,072

ALLOY STEEL

Original Filed July 12, 1940 3 Sheets-Sheet 1

| | C. | Mn. | P. | S. | Si. | Ni. | Cr. | V. | Mo. | Zr. |
|---|---|---|---|---|---|---|---|---|---|---|
| Steel "A" | .13 | .66 | .021 | .021 | .81 | .09 | .48 | | | .09 |
| Steel "B" | .16 | .69 | .032 | .023 | .85 | .08 | .51 | | .09 | .14 |

| | | | | | | | | |
|---|---|---|---|---|---|---|---|---|
| Steel "A" 1.Br. | 285 | 241 | 235 | 223 | 212 | 190 | 179 | |
| Steel "A" 1.Rock. | 30 | 23.4 | 22.5 | 20 | 16.4 | 11.7 | 7.1 | |
| Steel "B" 1.Br. | 375 | 364 | 340 | 302 | 262 | 230 | 217 | |
| Steel "B" 1.Rock. | 40 | 39.9 | 36.5 | 32.5 | 27.4 | 23.2 | 19.0 | |

| | | | | | | | |
|---|---|---|---|---|---|---|---|
| Quench | 1630 | 1630 | 1630 | 1630 | 1630 | 1630 | 1630 |
| Draw | 500 | 600 | 700 | 800 | 900 | 1000 | 1100 |

NORMALIZED 1600 QUENCHED IN WATER COOLED ON DRAW AIR.

INVENTORS.
Luciano G. Selmi,
Clarence L. Altenburger.
BY
Harness, Dickey & Pierce
ATTORNEYS.

April 14, 1942. L. G. SELMI ET AL Re. 22,072

ALLOY STEEL

Original Filed July 12, 1940 3 Sheets-Sheet 2

INVENTOR
LUCIANO G. SELMI
+ CLARENCE L.
ALTENBURGER
BY Harness, Dickey + Pierce
ATTORNEY INVENTORS
LUCIANO G. SELMI &
CLARENCE L. ALTENBURGER
BY Harness, Dickey & Pierce
ATTORNEYS Reissued Apr. 14, 1942

Re. 22,072

UNITED STATES PATENT OFFICE 22,072

ALLOY STEEL

Luciano G. Selmi, Detroit, and Clarence L. Altenburger, Dearborn, Mich., assignors to Great Lakes Steel Corporation, Ecorse, Mich., a corporation of Delaware Original No. 2,234,130, dated March 4, 1941, Serial No. 345,227, July 12, 1940. Application for reissue February 2, 1942, Serial No. 429,344

3 Claims. (Cl. 75—128)

This invention relates to steel and a composition of same particularly adapted to rolling into commercial shape of varied size and form such that the physical properties of the material of such variable sizes and forms do not depart appreciably from the optimum values within a range ordinarily covered by that class of steel which has become known to the trade as low alloy high tensile steels. The invention also relates to a steel of the aforesaid composition capable of being heat treated in varied shapes and sizes to predetermined but narrow ranges of hardness distributions or other physical properties dependent upon such hardness distributions.

Objects of the invention include the provision of an improved high tensile steel; the provision of an improved high tensile steel having a maximum of 0.50% molybdenum; and the provision of an improved high tensile having a maximum of 0.25% carbon.

Other objects of the invention include a provision for a steel whose composition shall be variable within definite ranges in accordance with the size and shape of the finished steel; the provision of an improved high tensile steel capable of being heat treated to predetermined but narrow ranges of hardness distribution or other physical properties dependent thereon.

The above being among the objects of the present invention, the same consists in a certain new and useful alloy steel and particularly to one of new and novel analysis as well as to articles formed therefrom whereby to impart to the same certain desirable characteristics, to be hereinafter described and then claimed, having the above and other objects in view.

Figure 4:
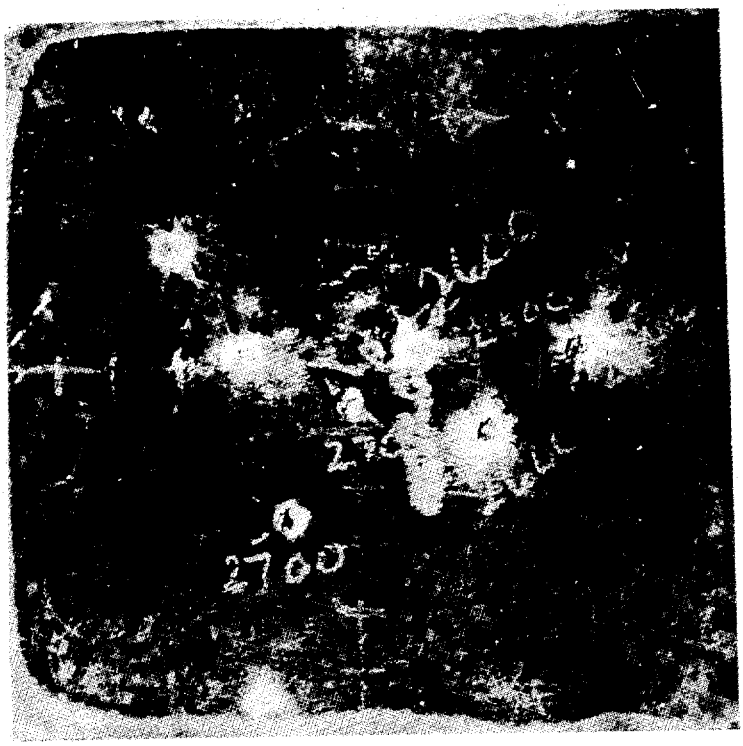
Fig. 4 is a photograph of a plate of steel having an analysis conforming to the present invention and having the surface thereof carburized and hardened, after having been hit with .30 caliber standard service bullets and .30 caliber armor piercing bullets.
Figure 5:
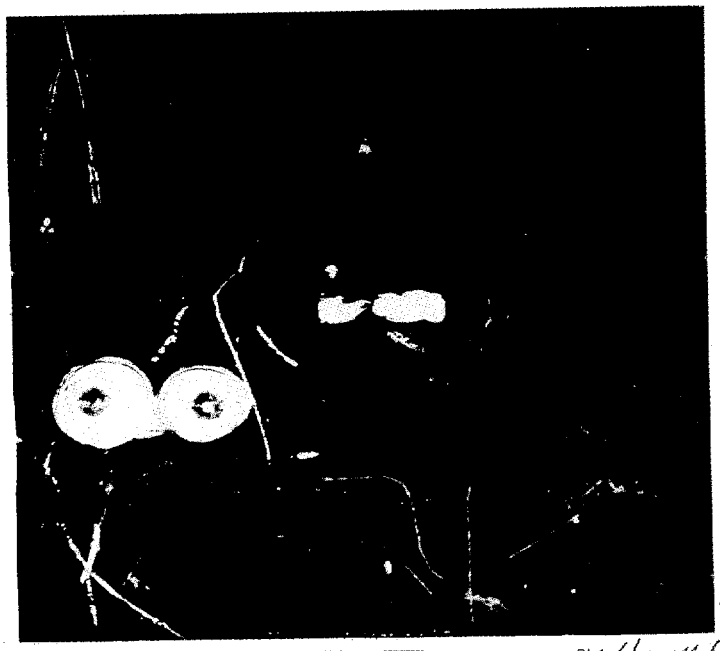
Figure 6:
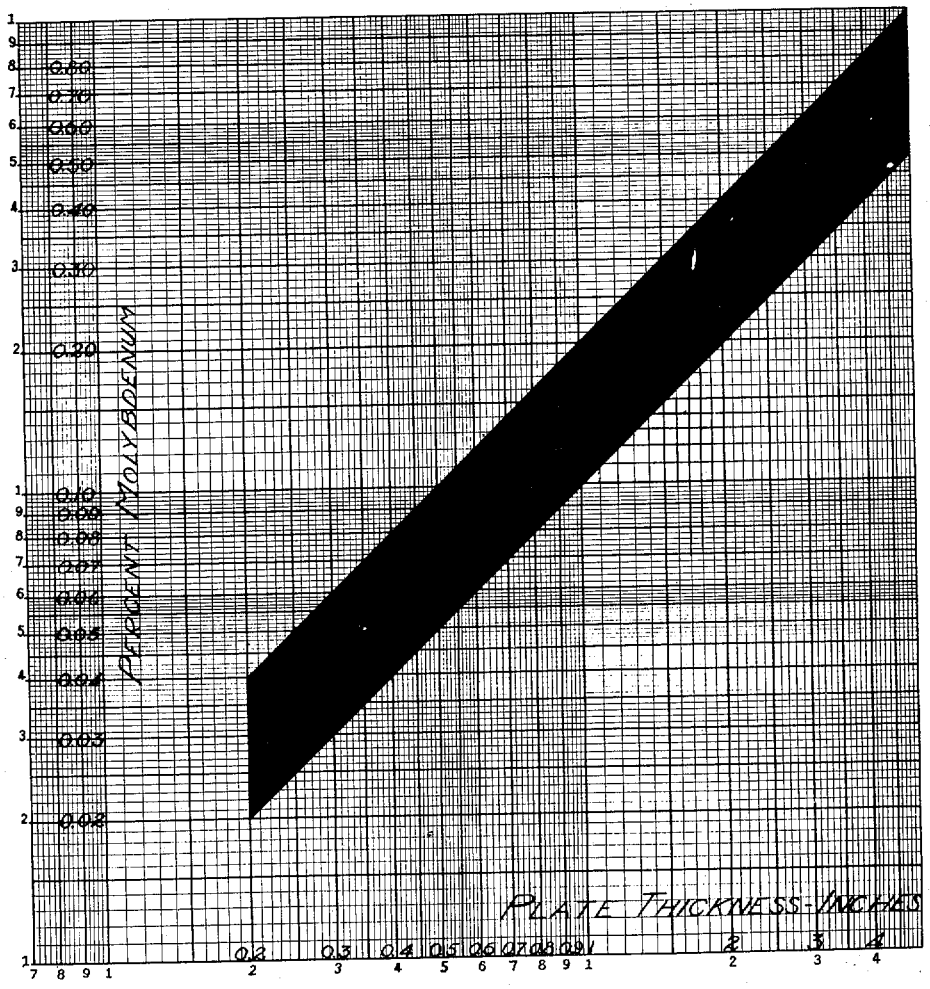

Fig. 5 is a view of a piece of steel similar to that shown in Fig. 4 and similarly carburized and hardened but lacking the molybdenum content of the steel of the plate shown in Fig. 4 and illustrating the effect of the same of .30 caliber standard service bullets; and, Fig. 6 is a chart illustrating the varying molybdenum content in the steel of the present invention according to the sectional thickness of the part made therefrom.

As is well known, many compositions of steel produced with laboratory facilities can be balanced chemically so as to produce physical properties within a given range. Such compositions may or may not be capable of yielding these same desired properties when subjected to the conditions prevailing in actual commercial steel manufacturing. Rolling temperatures, rate of cooling after rolling together with the size and shape of the finished material are the main variables affecting this condition.

In the specific case of those steels which have become known to the trade as low-alloy high tensile steels, in general they are required to possess tensile properties approximately as follows:

| | |
|---|---|
| Yield point | 50,000 p. s. i. min. |
| Tensile strength | 70,000 p. s. i. min. |
| Per cent elongation in 2" | 25% min. |

Many comparatively simple analyses are capable of producing tensile properties in the aforesaid range when rolled hot to comparatively thin gauges, by controlling finishing temperatures and by the use of copious application of water to the steel on the run out table or cooling bed after the steel has passed through the last stand of rolls. When the gauge or thickness of strip or plate, for example, increases, such procedures become rapidly less effective and tensile properties lower than the above minima are obtained from the steel in its rolled condition.

In the past few years the requirements of low alloy high tensile steels have increased swiftly. They were originally intended for relatively simple fabrication methods. Today such steels must weld by all commercial welding processes as easily as mild carbon steels; they must be equal to or better than mild carbon steels in the matter of deep drawing objects therefrom; they must be capable of responding to the ordinary methods of heat treatment and case hardening; they must possess good notched bar resistance at both normal and sub-normal temperatures, high fatigue resistance, especially fatigue resistance at notches or other stress-raisers which may reside within the body of the steel itself. The steel should have all contained nitrogen fixed in inactive forms and be free from strain or quench aging. The steel must not be air hardening at any carbon content and should possess no precipitable elements capable of impairing its physical properties upon stress relieving after welding or normalizing. This imposing list of properties demanded by modern steel users is due in part to the increasing precision of modern manufacturing and partly to the increased use of technical testing of fabricated structures.

A steel, which will hereafter be referred to as steel "A," of the following analysis has been found partly to fulfill the above:

| | Per cent |
|---|---|
| Carbon | .05– .20 |
| Manganese | .50– .75 |
| Silicon | .70– .90 |
| Chromium | .45– .75 |
| Zirconium | .10– .15 |
| Phosphorus | .03 max. |
| Sulphur | .03 max. |

The balance is iron and incidental impurities. The permissible rolling temperatures are, however, quite narrow on the thinner gauges. On the heavier gauges the cooling rate is too slow to obtain the desired tensile properties in the finished material. Moreover the hardenability of the steel is too low to make heat treatment by quenching and drawing effective for most purposes above about one-half inch diameter round. Moreover, hardness distributions across heat treated sections cannot be controlled to predetermined but narrow ranges except on small or thin shapes.

It has been found in accordance with the present invention that a steel, hereinafter referred to as steel "B," of materially better characteristics than the above mentioned steel, adapting it to the same and also to wider and different fields of use, can be obtained by producing a steel incorporating the same alloying agents as in the steel above mentioned but containing, in addition thereto, small amounts of molybdenum, with or without the further addition of small amounts of nickel and/or copper. In other words a steel according to the present invention will have the following composition.

| | Per cent | |
|---|---|---|
| Carbon | .05– .25 | |
| Manganese | .50– .75 | |
| Silicon | .70– .90 | |
| Chromium | .24– .75 | |
| Zirconium | .10– .15 | |
| Molybdenum | .02– .50 | |
| Phosphorus | .03 max. | |
| Sulphur | .03 max. | |
| Nickel | Up to .6 | Optional or unavoidable |
| Copper | Up to .3 | |

The nickel and copper may be present as residual elements. That is, they may be present in the final steel because of forming an alloying element of the steel scrap employed in the production of the steel of the present invention. Where present as residuals nickel may be present in amounts up to approximately 0.10% and copper in amounts up to approximately 0.14%. Amounts of nickel up to 0.6% and copper up to 0.3% may occur in the alloy of the present invention without materially affecting the properties thereof, the nickel in the higher amounts perhaps adding some toughness, enhancing the heat treatment and reduction of area to a slight extent, and adding somewhat to the corrosion resisting properties of the alloy. However, the effects of adding nickel and/or copper up to the maximum percentages noted will not materially affect the principal characteristics of the alloy of the present invention, and it may be added or eliminated as desired, and this fact is to be kept in mind in the following specification and claims regardless of whether these two elements, or either one of them, is called for or not. In other words their presence is permissive but not compulsory.

The steel resulting from this analysis, particularly where properly heat treated, will be found to have all of the desirable attributes or characteristics heretofore listed as required of a steel of this general type under present day requirements.

As an example of the effect of added molybdenum on the tensile properties of one inch diameter bar rolled with the same procedure on a fourteen inch merchant mill from 200 ton basic open hearth heats the following is cited:

| Steel | | A | B |
|---|---|---|---|
| Carbon | percent | .13 | .16 |
| Manganese | do | .66 | .69 |
| Phosphorus | do | .021 | .030 |
| Sulphur | do | .021 | .023 |
| Silicon | do | .81 | .85 |
| Chromium | do | .48 | .51 |
| Zirconium | do | .094 | .14 |
| Molybdenum | do | None | .090 |
| Tensile strength | p. s. i. | 72,000 | 83,000 |
| Yield point | p. s. i. | 56,000 | 61,000 |
| Elongation 2" | percent | 42 | 37.0 |
| Red. area | do | 74 | 70.0 |

As is evident the tensile strength and yield point are materially raised by the molybdenum addition.

The effect on the tensile properties after heating to 1600° F. and air cooling are as follows:

| Steel | | A | B |
|---|---|---|---|
| Tensile strength | p. s. i. | 71,000 | 81,000 |
| Yield point | p. s. i. | 52,500 | 57,000 |
| Elongation | percent | 42.0 | 36.0 |
| Red. area | do | 75.0 | 70.0 |

As is evident, steel "A" has approached very nearly the minimum requirements. Upon still slower cooling as by annealing from 1600° F. and cooling to room temperature with the furnace over a two day period, the following results are obtained.

| Steel | | A | B |
|---|---|---|---|
| Tensile strength | p. s. i. | 68,000 | 75,000 |
| Yield point | p. s. i. | 45,000 | 50,500 |
| Elongation | percent | 42 | 36 |
| Red. area | do | 72 | 61 |

As can be seen, steel "A" has fallen below the minimum requirements whereas steel "B" is still above them.

In the rolling of flat products on mills such as modern high speed strip mills, it has been found that steels of the analyses of steel "A" are affected by finishing temperatures as follows:

| Finishing temperature | Tensile strength | Yield point |
|---|---|---|
| 1600° F. | 76,000 to 80,000 | 51,500 to 54,500 |
| 1700° F. | 74,000 to 76,000 | 50,000 to 52,000 |
| 1750° F. | 72,000 to 76,000 | 45,000 to 49,000 |

On the other hand, it has been found that steel of the analysis of steel "B" the finishing temperatures may be materially raised without sacrificing tensile properties, thereby improving the surface and tolerance of the strip. As examples, the following are given.

*Finishing temperature 1717 to 1720° F.*

| | Transverse | Longitudinal |
|---|---|---|
| Tensile strength ..... p. s. i | 83,130 | 83,130 |
| Yield point ..... p. s. i | 60,310 | 60,310 |
| Elongation 2" ..... percent | 32 | 35 |
| Elongation 4" ..... do | 26 | 26 |
| Elongation 8" ..... do | 21 | 22 |

*Finishing temperature 1771° F.*

| | Transverse | Longitudinal |
|---|---|---|
| Tensile strength ..... p. s. i | 79,240 | 79,050 |
| Yield point ..... p. s. i | 55,000 | 53,650 |
| Elongation 2" ..... percent | 36 | 38 |
| Elongation 4" ..... do | 27 | 29 |
| Elongation 8" ..... do | 21 | 24 |

It will be obvious from the foregoing that plate of heavier gauge can be successfully rolled when such steels of the aforesaid classification contain molybdenum in relatively small proportions.

Figure 1:
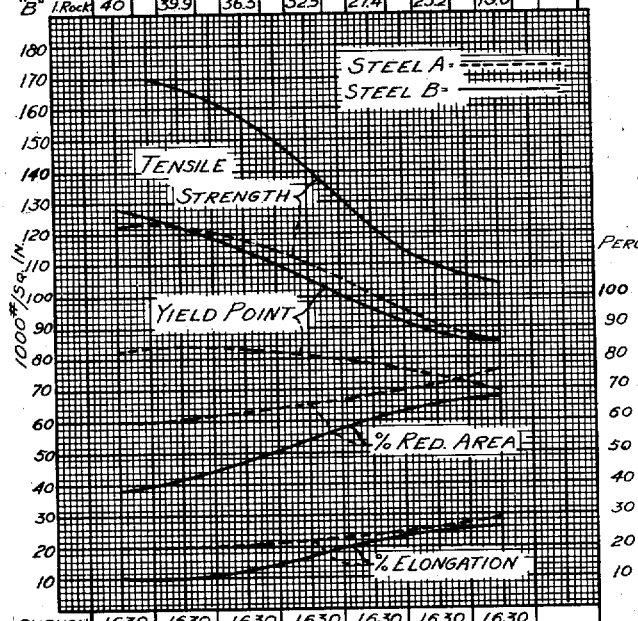
Fig. 1 is a chart illustrating the properties of the steel of the present invention after heat treatment.

In the chart shown in Fig. 1 the response of the steel of the present invention to heat treating by quenching and drawing is illustrated by the full line curves and its comparison to the steel "A" lacking the molybdenum content is brought out by showing the properties of the latter steel under the same conditions by the dotted line curves. It will be readily understood from these charts that steels of the analyses of the present invention are capable of yielding much higher tensile properties and/or appreciably higher drawing temperatures when heat treated than the similar steel "A". Pertinent data is given in Fig. 1 in regard to heat treatment procedure which will readily be appreciated by those skilled in the art.

Figure 2:
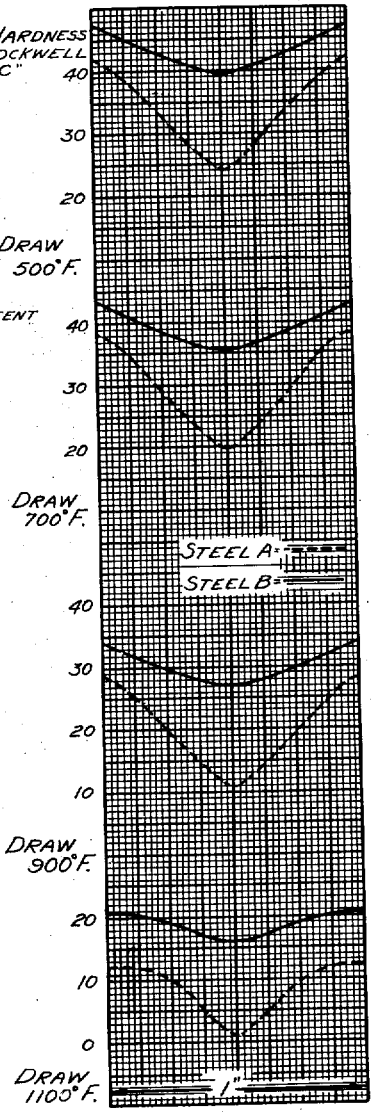
Fig. 2 is a chart illustrating the hardness of the steel of the present invention across quenched and tempered sections at various drawing temperatures.
Figure 3:
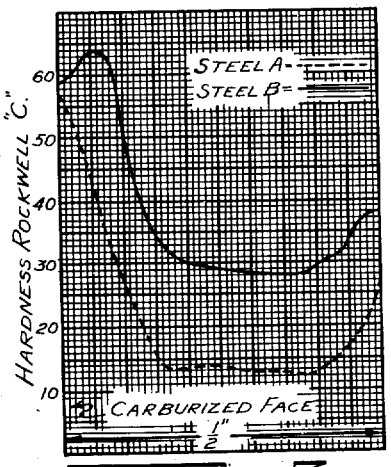
Fig. 3 is a chart illustrating the hardness at various points through a one-half inch plate formed of the steel of the present invention and which plate has been carburized on one face.

In the charts of Fig. 2 hardenability curves of the steel of the present invention taken through a round of one inch diameter for various drawing temperatures are shown in full lines and the corresponding hardness curves for the similar steel above referred to as steel "A" are illustrated in comparative relation by dotted lines. As will be readily understood by those skilled in the art the curves in Figs. 1 and 2 show that much larger sections of steel having the analyses of the present invention can be successfully heat treated than the steel of the prior analysis "A". It might be noted that the steels shown in the charts of Fig. 3 were normalized from 1600° F., re-heated to 1630° F. and quenched in water. Thereafter they were tempered or drawn from one hour at the temperatures indicated for the various curves in Fig. 2 sectioned with a water cooled rubber wheel, the surface ground smooth on fine emery paper and the Rockwell "C" hardness determined at various distance along the radii of the section to obtain the hardness distribution indicated.

In the matter of carburizing, it has been found that the case strength after heat treating of both steel "A" and steel "B" to compare with the highest types of alloy steels for carburizing known to the trade. The core hardness is too low for many purposes in steel "A" but steel "B", due to its greater hardenability, corrects this condition.

In the specific case of armor plate applications, this is a matter of paramount importance. In such applications, one face of the steel plate to be fabricated into armor plate is carburized. Thereafter, the plate is heat treated. It is required that the face not carburized be not too hard for in that event a bullet striking the carburized side may effect cracking on the other side and throw splinters or particles off therefrom defeating the purpose of such armor. On the other hand, if the material of the plate in regions not carburized be too soft the case will spall off when struck by a bullet and hence render that area liable to penetration upon being struck by a second bullet thus defeating the purpose of the armor. Illustrations of such spalling will be observed in the photograph of Fig. 5.

The photographs of Figs. 4 and 5 are those of one-half inch plates carburized in each case to a depth equal to 25% of the thicknesses of the plate on one side only and heat treated. Slices cut from the center of the width of the plate gave a distribution of hardness across the thickness as shown in two cases in Fig. 3. The plate of steel "B" when struck with a .30 caliber standard service bullet for Regular Army Springfield .30–06 rifle at 50 feet showed no penetration or deformation as shown in the photograph of Fig. 5. In the case of steel "A", however, as shown in Fig. 5, the bullets spalled off the case of high carbon content in an area around the point of striking of about one inch diameter as shown. Further, the plate of steel "B" is not penetrated by armor piercing bullets from the same rifle mentioned hereinbefore at bullet velocities up to 2900 feet per second. In the plate of steel "A" the opposite is true.

In the photograph of Fig. 4, the two spots in the upper lefthand corner were produced with ordinary service bullets, the others were produced with armor piercing bullets. In the photograph of Fig. 5 the two spots in the lower lefthand corner show how the case spalled off when struck with regular service bullets.

It will be understood that I do not confine myself to the specific analyses set forth above. For many purposes as for instance, heavy plate where hardnesses in excess of those shown in the appended charts are required, it will be advantageous to increase both carbon and molybdenum. To attain hardness well over 50 Rockwell "C" in the centers of heavy plate, carbon as high as 0.25% and molybdenum up to 0.50% will be required in accordance with the chart shown in Fig. 5, wherein the shaded area covers satisfactory molybdenum ranges at each plate or other sectional thickness. The lower part of the shaded area is represented by the equation $$\text{Percent Mo} = 0.005 + \frac{t - \frac{1}{2}}{10} \quad \text{(1)}$$

where "$t$" is the thickness of the plate or thickness of section in other shapes in inches and percent Mo is the percent molybdenum in the steel. Ordinarily plate will preferably have a composition represented by the top of the shaded area along a line whose equation is, $$\text{Percent Mo} = .10 + \frac{t - \frac{1}{2}}{5} \quad \text{(2)}$$

Rounds on the other hand will preferably have a composition approximately in accordance with Equation 1.

It will be appreciated that by combining the above equations to cover the molybdenum content of a steel within the range of the present invention and as indicated in the shaded area, the resulting equation will be:

$$\text{Percent Mo} = 0.005 \text{ to } 0.10 + \frac{t - \frac{1}{2}}{10} \text{ to } \frac{t - \frac{1}{2}}{5}$$

Thus it will be seen that the thin plate given as .2 inch thickness has .02% to .04% molybdenum and this amount increases progressively as shown by the black or shaded area. There the molybdenum range reads .50% to 1.00% for 5 inches thickness of plate.

From the foregoing description it will be seen that the applicants have produced a low alloy high tensile steel having its alloy element selected, combined and balanced within narrow, but specific and critical ranges, whereby the improved steel having the characteristics and accomplishing the objects set forth is provided.

Having thus described our invention, the nature and scope thereof are defined in the appended claims, it being understood that the particular relationships and ranges specified may be subject to slight or reasonable variation without departing from the spirit of our invention.

What is claimed is:

1. A low alloy, high tensile steel having properties of welding by commercial processes, deep drawing, high fatigue resistance and freedom from strain or quench aging, containing 0.05% to 0.25% carbon, 0.50% to 0.75% manganese, 0.70% to 0.90% silicon, 0.50% to 0.75% chromium, 0.10% to 0.15% zirconium, phosphorus 0.03% maximum, sulphur 0.03% maximum, from a trace of nickel up of 0.25%, 0.02% to 0.50% molybdenum, and all the remainder being iron and incidental impurities.

2. A low alloy, high tensile steel having the properties of deep drawing characteristics, capable of being welded by commercial processes, high fatigue resistance and freedom from strain aging, containing about 0.15% carbon, about 0.70% manganese, about 0.85% silicon, about 0.50% chromium, about 0.14% zirconium, about 0.09% molybdenum, not over 0.03% phosphorus, not over 0.03% sulphur, not over 0.6% nickel, all the remainder being iron and incidental impurities.

3. An article having a sectional thickness measured in inches, and formed of an alloy steel containing iron and incidental impurities, with 0.05% to 0.25% carbon, 0.50% to 0.75% manganese, 0.70% to 0.90% silicon, 0.50% to 0.75% chromium, 0.10% to 0.15% zirconium, 0.03% maximum of phosphorus, 0.03% maximum of sulphur, nickel from a trace to 0.25%, and molybdenum in quantities having a predetermined relationship to the sectional thickness of the article and the quantities varying proportionately between limits from 0.02% to 0.04% for .2 inch to 0.25 to 0.50 for 2½ inches thickness as herein shown and described.

LUCIANO G. SELMI.
CLARENCE L. ALTENBURGER.